United States Patent [19]

Armond

[11] Patent Number: 4,595,869
[45] Date of Patent: Jun. 17, 1986

[54] SOLID STATE ELECTRICAL CONTROL FOR A REVERSIBLY MOVABLE MEMBER

[75] Inventor: Joseph A. Armond, River Grove, Ill.

[73] Assignee: Electro-Matic Products Company, Chicago, Ill.

[21] Appl. No.: 603,357

[22] Filed: Apr. 24, 1984

[51] Int. Cl.⁴ .............................................. G05G 5/00
[52] U.S. Cl. .................... 318/626; 318/282; 318/467
[58] Field of Search ............. 318/653, 467, 468, 282

[56] References Cited

U.S. PATENT DOCUMENTS

| | | | |
|---|---|---|---|
| 3,129,369 | 4/1964 | Littwin | 318/282 |
| 3,213,342 | 10/1965 | Littwin | 318/282 X |
| 3,247,434 | 4/1966 | Littwin | 318/282 |
| 3,588,651 | 6/1971 | Littwin | 318/466 X |
| 3,639,821 | 2/1972 | Byers et al. | 318/282 |
| 3,684,961 | 8/1972 | Muir | 318/653 X |
| 4,251,762 | 2/1981 | Williams | 318/653 |

*Primary Examiner*—B. Dobeck
*Attorney, Agent, or Firm*—Paul H. Gallagher

[57] ABSTRACT

In a grinder, the table carrying the workpiece to be ground reciprocates to carry it past a grinding wheel. The table moves armatures oppositely into and out of respective coils, inducting voltage therein for driving the reversible motor that moves the table. Remote coils with manually settable armatures therein oppose the first coils for determining the range of movement of the table. A control circuit includes right and left halves corresponding to the directions of movement of the table. Right and left SCR's control the current from first coils to the drive motor, transistors control the gating current to the SCR's; triacs control the current from the transistors, and other triacs control the current from the main source to the drive motor.

2 Claims, 6 Drawing Figures

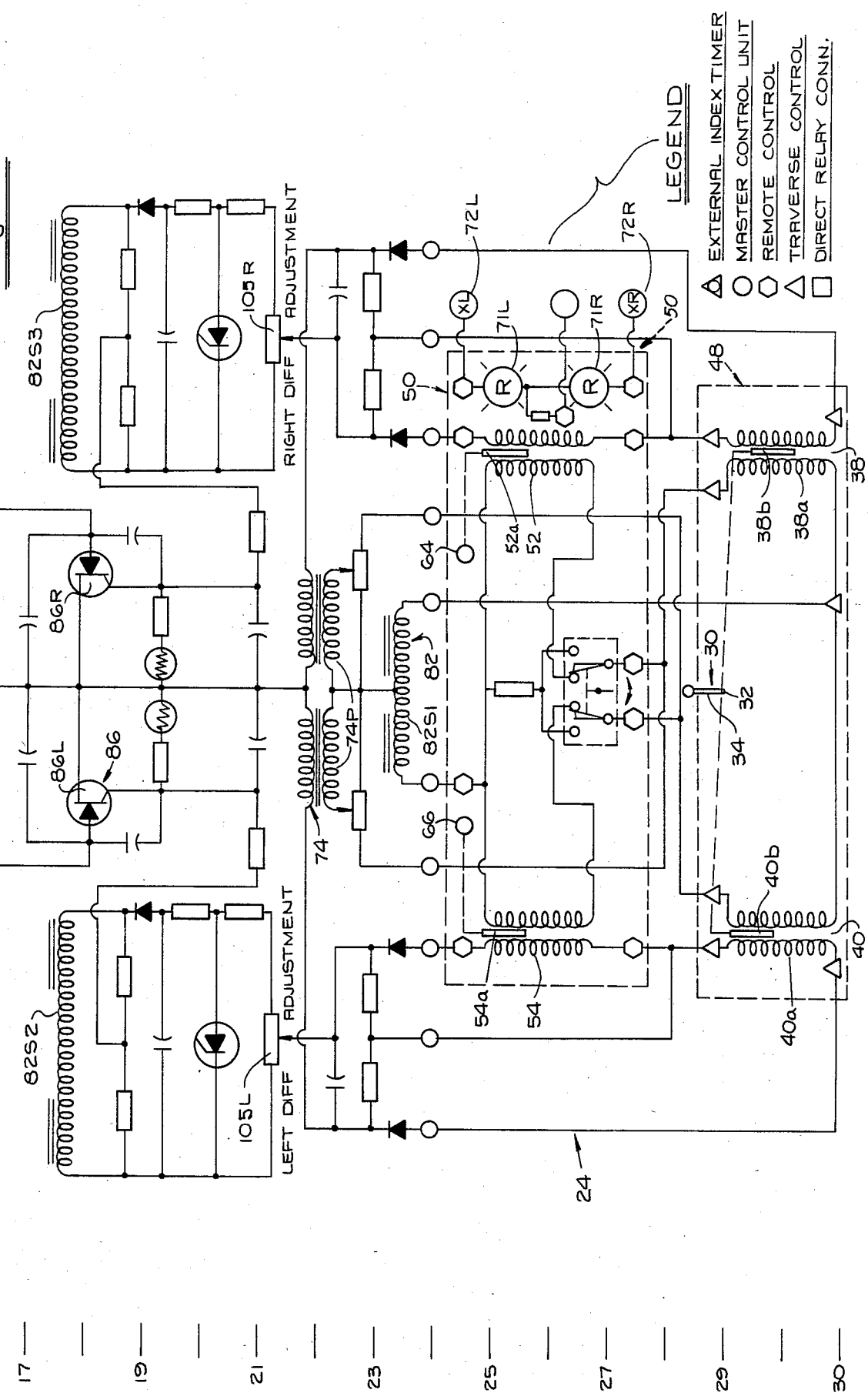

SOLID STATE ELECTRICAL CONTROL FOR A REVERSIBLY MOVABLE MEMBER

FIELD OF THE INVENTION

The invention resides in the field of controlling the operation of machine tools that have reversibly movable members. A grinder is a good example of such a machine tool. A grinder includes a table on which the workpiece to be ground is placed, and the table reciprocates, carrying the workpiece with it. A grinder head includes a grinding stone that is brought into engagement with the workpiece and as the table and workpiece move, the grinding stone performs the grinding operation throughout the length of the workpiece. The grinding stone is narrower than the workpiece, and the grinder head is reciprocated for carrying the grinding stone reversely across the workpiece, to perform a number of passes thereon. The invention relates to means for controlling such reversing movements.

CROSS REFERENCES - U.S. PATENTS

U.S. Pat. No. 3,045,165 Littwin, July 17, 1962
U.S. Pat. No. 3,129,369 Littwin Apr. 14, 1964
U.S. Pat. No. 3,588,651 Littwin, June 28, 1971

OBJECTS OF THE INVENTION

A broad object of the invention is to provide a control means for controlling the movements of reversely movable members, of the character referred to, and such having the following features and advantages:
1. It is of total solid state character.
2. It is quick-acting in response to sensing controls and accordingly extremely accurate.

DESCRIPTION OF A PREFERRED EMBODIMENT

In the drawings,

FIG. 6 is a diagram of the other portion of the electrical circuit, to be used with FIG. 5.

Figure 5:
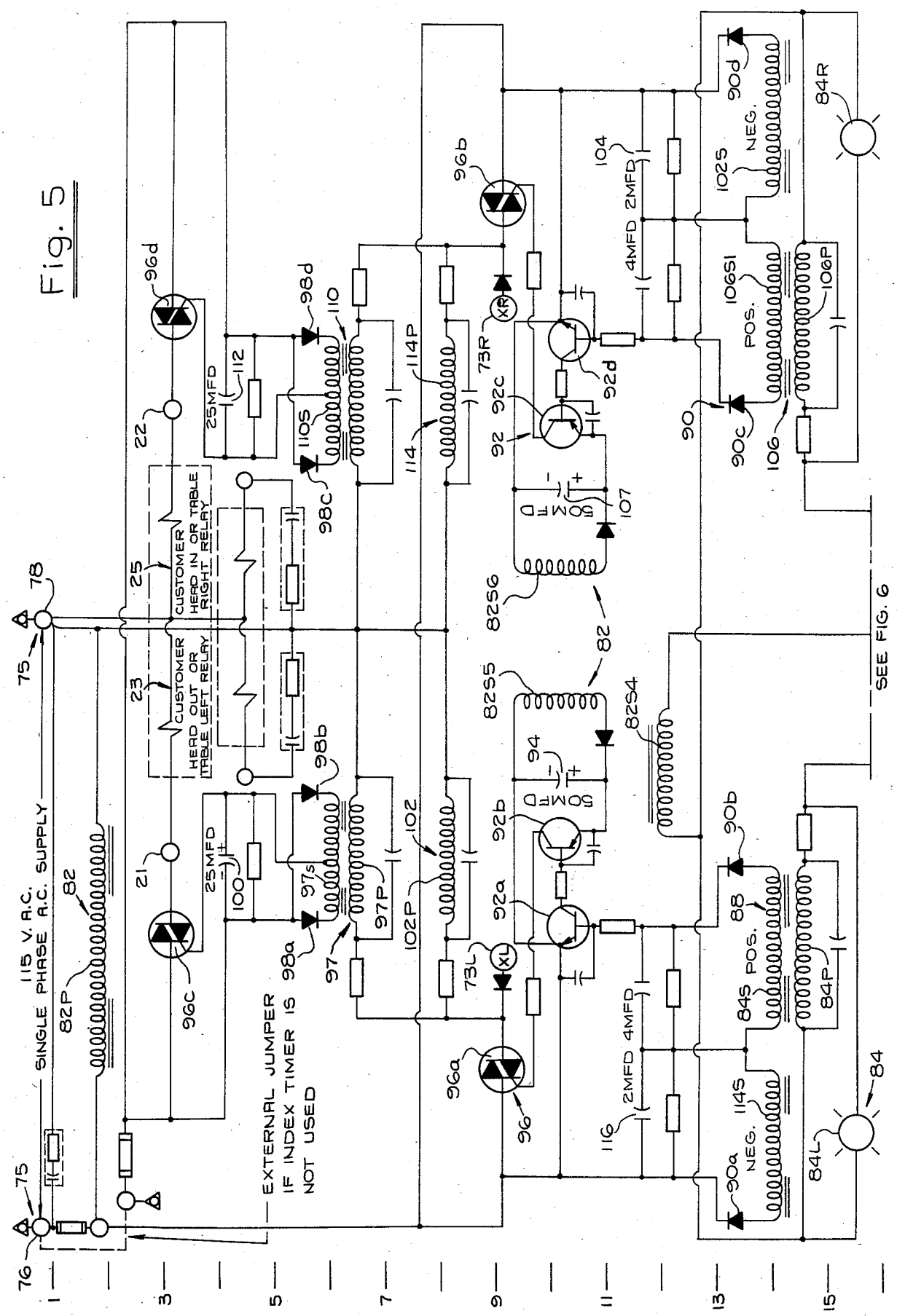
FIG. 5 is a diagram of a portion of an electrical circuit, to be used in conjunction with FIG. 6.

In the electrical circuitry of FIGS. 5 and 6, the diagrams are provided with line numbers at the left margins thereof to facilitate designating the locations of the various elements referred to, these line numbers being given in parentheses following the references to the corresponding elements in the description thereof. In the identification of the transformers, each transformer is identified with a general reference numeral, and the primary by the same reference numeral with the letter P, and the secondary also by the same reference numeral with the letter S.

Figure 1:
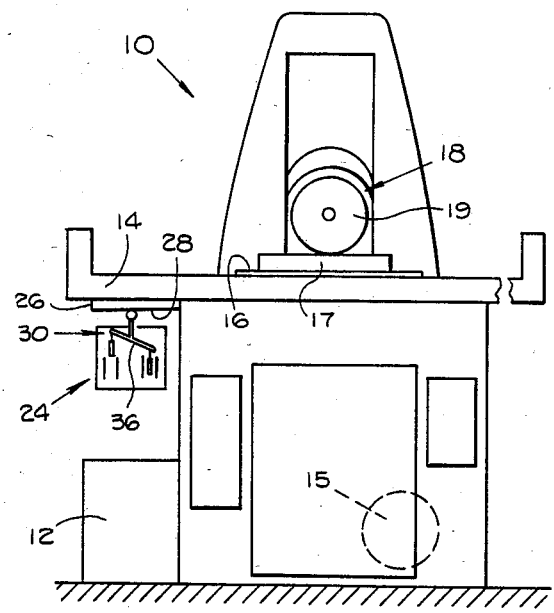
FIG. 1 is a perspective view of a grinder to which the invention is applied.
Figure 2:
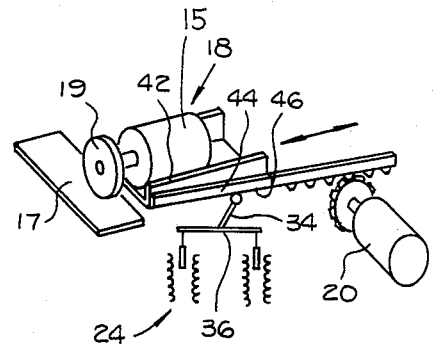
FIG. 2 is a fragmentary perspective view of one component of the grinder of FIG. 1.

Referring in detail to the drawings, FIG. 1 shows a grinder 10 which may be similar to that shown in U.S. Pat. No. 3,588,651 referred to above and includes a base 12 on which is mounted a reciprocable table 14, constituting one of the movable members referred to. The table is driven by a reversible electrical motor 15. Incorporated in the table is a magnetic chuck 16 for holding a workpiece 17 thereon that is to be ground. A grinder head 18 is mounted in the grinder, having a grinding stone 19 for grinding the workpiece. The grinder head 18 is movable vertically, for bringing the grinding stone down into engagement with the workpiece, and it is also reciprocable axially by a reversible electrical motor 20 (FIG. 2).

In the grinding operation, the table 14 is reciprocated longitudinally, carrying the workpiece with it, and the grinding stone is held in grinding engagement with the workpiece, and in response to the movement of the table, the grinding step is performed. Normally the grinding stone is narrower than the workpiece, and to grind the complete surface of the workpiece, the axial movement of the grinder head, referred to, is performed, that is, after one pass of the table in one direction, the grinder head is advanced axially, to bring the grinding stone to another position on the workpiece, so that in a plurality of such passes of the table, the full grinding operation is performed.

The control apparatus of the invention, in a single form, is applicable to the table 14 for controlling it, or to the grinder head 18 for controlling that component, there being one control apparatus however for each of these components. The electrical circuit of the apparatus is shown in FIGS. 5 and 6 and is applied to the grinder of the customer which includes electrical terminals 21, 22 (FIG. 5, top). The grinder includes relays 23, 25 (FIG. 5, top) connected between those terminals and operable for driving the respective motor 15 or 20 to which they are connected, in corresponding directions. These relays are designated "Head Out or Table Left Relay" and "Head In or Table Right Relay", indicating their function according to the motor to which they are connected. How the control impulses are transmitted to the relays is described hereinbelow.

A control unit is indicated generally at 24 (FIGS. 1, 2 and 3) that is actuated by the reciprocable member, i.e., table or grinder head, that is included in the apparatus. In the case of applying the apparatus to the table, the table is provided with a taper bar 26 having an inclined under surface 28. The unit 24 includes an actuator 30 pivoted at 32 and having an arm 34 engageable with the surface 28 of the taper bar. It also includes a beam 36, and coil units 38, 40, having coils 38a, 40a, respectively; and associated with these coil units are armatures 38b, 40b pivoted on the beam and movable into and out of the coil units in response to movement of the beam which in turn is moved by the table, as referred to hereinbelow.

In the case of the grinder head 18, attention is directed to FIG. 2 showing the grinder head mounted on a base 42 which is reciprocably movable in the direction noted. Mounted on this base 42 is a taper bar 44 similar to the taper bar 26, having an inclined surface 46, but diamensioned according to the extent of movement of the grinder head. Associated with the taper bar 44 is the control unit 24 described above.

Figure 3:
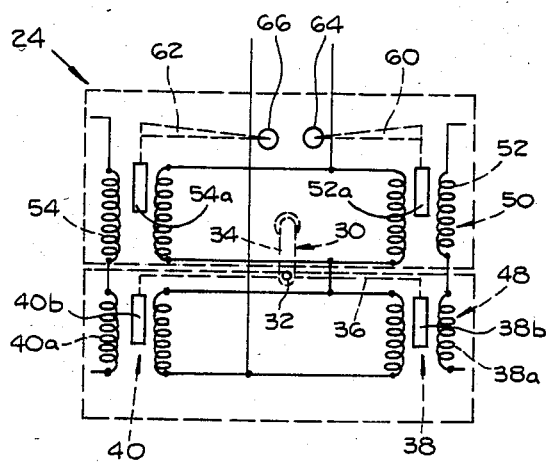
FIG. 3 is a diagram of a control unit of the apparatus of the invention.
Figure 4:
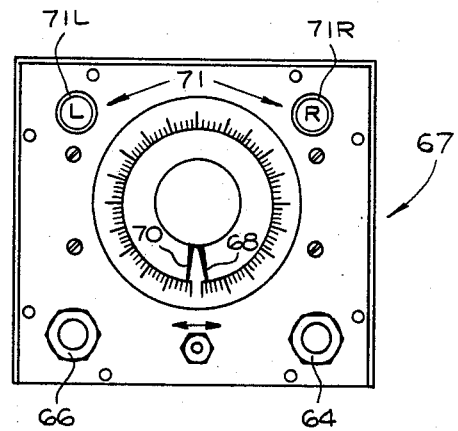
FIG. 4 is a view of a control panel for manual operation.

Attention is directed next to FIG. 3 showing details of the control unit 24. The control unit 24 includes a traverse unit 48 and a remote unit 50. The traverse unit 48 includes the elements referred to above,—the actuator 30, pivot point 32, arm 34, beam 36, coil units 38, 40, coils 38a, 40a, and armatures 38b, 40b. The remote unit 50 includes coil units 52, 54, respectively connected in series with the coil units 38, 40, and mounted for movement in these coil units are armatures 52a, 54a, respectively which are mounted independently on individual arms 60, 62, these arms being actuated by manually adjustable knobs 64, 66. These knobs may be located in a convenient panel 67 (FIG. 4). For convenience, the prefixes "traverse" and "remote" may be used to designate similar elements in the corresponding units.

The control unit 24, illustrated in FIG. 3, and the principal elements thereof are shown also in FIG. 6 (27). The armatures 52a, 54a are individually set, in the coil units, by adjustably setting the knobs 64, 66. Pointers 68, 70 (FIG. 4) are associated with the knobs to indicate their settings, and in the actuation of the knobs the pointers are moved correspondingly, but the unit is arranged so that when the pointers are at a minimum range of movement, continued moving of either of the knobs against the other one, will move both pointers, so as to maintain the minimum range, and not cancel it out. Indicator lights 71, individually identified 71L, 71R, are included in the panel, to indicate which of the left and right circuit portions are energized, see also FIG. 6 (24), being connected with terminals 73L, 73R which appear in FIG. 5 (9), these being incorporated in the left and right portions of the circuit.

In the actuation of the movable member (table, grinder head) the armatures 38b, 40b move oppositely into and out of their coils, and this movement builds up inductance in those coils, and this inductance is counteracted by the armatures 52a, 54a, according to their setting, and thus the settings of these armatures determine the range of movement of the table. The voltage buildup and control thereof are controlled by the transformer secondary 82S1 (24) and transformer 74 (22) having corresponding series connection with the control units 48, 50.

FIG. 5 shows a main source of AC supply 75 (1) having terminals 76, 78 leading directly to the relays 23, 25 and to which is connected a main transformer 82. The secondary 82S1 appears in FIG. 6 (24) in direct association with the control unit 24.

In the following description the movements of the table are represented by movements of the actuator arm 34. A starting position is assumed (FIG. 1) in which the actuating arm 34 is up, the table is at the right, and the left portion of the circuit is on; also the armature 40b is in an upper position and the armature 38b in a lower position. In FIG. 5 are differential pilot lights 84 (16), 84L at the left, and 84R at the right, indicating when the left portion and the right portion of the circuit are energized. Shown in FIG. 6 are SCR's 86 (18) individually identified as 86L and 86R. In the condition of the circuit as just referred to, the SCR 86L is energized, or on, and a voltage is applied across the primary of an interstage transformer 88 (14).

FIG. 5 also shows a series of four transistors 92 (10), individually identified with postscripts. The positive from the rectifier 90b is applied to the base of the transistor 92a, turning it on, and as it is turned on, a negative voltage from a capacitor 94 (10), which is a fixed DC power supply, from the secondary 82S5 (10), is passed from the emitter to the collector of the transistor 92a, through that transistor, and to the base of the transistor 92b, turning on the latter. When the transistor 92b is turned on, a positive voltage from the capacitor 94 is passed through the transistor 92b to the gate of a triac 96a (9), which is one of a series of four triacs 96. The triac 96a is thus turned on, and as a result thereof the following three functions are performed, simultaneously: (a) the left directional pilot light 71L (24) (see also FIG. 4) will light; (b) an AC voltage is applied across the primary of an interstage transformer 97 (6), and the voltage from the secondary thereof is rectified to full wave DC through diodes 98a, 98b, with the positive from the capacitor 100 applied to the gate of the triac 96c, turning it on. This energizes the customer's relay 23 (3) which effects driving the motor 15 (or 20) in corresponding direction; (c) an AC voltage is applied across the primary of an interstage transformer 102 (8), and the secondary voltage thereof is rectified by the diode 90d (13) and filtered by a capacitor 104 (11).

The circuitry just referred to includes slightly counteracting voltages, to provide a slight negative voltage on the base of the transistor 92d (10) to prevent it from being turned on. This forms an interlock circuit for preventing both the right and left portions from being turned on simultaneously. Differential adjustments are provided at 105R and 105L (21) between the controls 48, 50 and the respective halves of the control circuit (FIG. 5) for assuring that at least one-half is energized at all times, to prevent a complete null condition, although as the circuitry approaches a reversing position, one-half has increased to a great value and the other half to a very low value. These adjustment elements are normally set at the factory.

A similar series of steps takes place in the movement in the opposite direction, but oppositely or symmetrically oriented. In such opposite movement, as the actuator arm 34 (28) moves down, the right differential amplifier pilot light 84R (16) is turned on, and the voltage of the gate of SCR 86L (18) slowly diminishes, while the voltage of the gate of SCR 86R (18) increases. When the actuator arm 34 reaches the null point of the setting of the remote control station, the SCR 86L turns off, and the SCR 86R will be on. When the SCR 86L turns off, the transistors 92a, 92b (10) and the triac 96a (9) will be turned off. When the SCR 86R (18) is turned on, a voltage is applied across the primary of an interstage transformer 106 (14) and the AC voltage from the secondary 106S1 is converted to DC by the rectifier 90c (13), with the positive applied to the base of the transistor 92d, (9) turning on this transistor. As this transistor is turned on, a negative voltage from a capacitor 107 (10) which is a fixed DC power supply, is passed from the emitter to the collector of the transistor 92d to the base of the transistor 92c, turning on the latter. When the transistor 92c is turned on, a positive voltage from the capacitor 107 passes from the emitter to the collector of the transistor 92c to the gate of the triac 96b (9) turning it on. When the triac 96b is turned on, similarly to the condition before, three functions take place simultaneously: (a) the right directional pilot light 71R (24) on the remote control will light; (b) an AC voltage is applied across the primary and the secondary of an interstage transformer 110 (6). The voltage from this secondary 110S is rectified to full wave DC through the diodes 98c, 98d (5), with the positive from a capacitor 112 (4) applied to the gate of the triac 96d (3), turning it on. When this triac is turned on, it completes a circuit to the customer's relay 25, which, as related to the relay 23 referred to above, drives the motor 25 (or 20) in the opposite direction; (c) an AC voltage is applied across the primary of an interstage transformer 114 (8), and the voltage from the secondary thereof 114S (14) is rectified to DC by the diode 90a, and filtered by a capacitor 116 (12). The circuitry just referred to, acts similarly to the opposite arrangement described above, namely, it provides a slight negative voltage to the base of the transistor 92a (10) and prevents it from being turned on, this providing an interlock protective circuit.

End of Descriptive Specification

I claim:

1. Apparatus for controlling the movements of a reversely movable member through a full range of movement, of the kind that includes a reversible electrical drive means having input terminals, a traverse unit and a remote unit, the traverse unit including a pair of traverse coils corresponding to the respective ends of said range of movement, and traverse armatures in the coils respectively oppositely and simultaneously movable into and out of the coils in response to the opposite movements of the movable member, the remote unit including a pair of remote coils respectively serially connected to the coils of the traverse unit and remote armatures therein individually manually adjustable and settable, the traverse armatures being operable for producing varied induced voltage in the traverse coils, and the remote armatures, in response to their setting, being operable for establishing limits of the values of the voltages so produced, the apparatus comprising, control apparatus operable in response to the voltage in the traverse coils, reaching a predetermined value, for transmitting current respectively in opposite directions through said input terminals and thereby through the drive means, first triacs respectively connected with said input terminals, the apparatus incorporates a main circuit including right and left halves, each half circuit including a respective one of said triacs, and means responsive to energizing one-half circuit for providing a counter voltage on the other half for preventing simultaneous energization of both halves, an SCR in each half circuit, means responsive to movement of the movable member in each direction for developing DC and imposing it on the respective SCR and thereby energizing the respective half circuit, means for producing DC in movement of the movable member in each direction, of respectively opposed polarity, and capacitor means for storing the DC, and triggering means responsive to the movable member reaching its limit of movement in each direction for discharging the capacitor means and energizing the corresponding half circuit and reversing the direction of movement of the movable chamber.

2. Apparatus according to claim 1 wherein, the circuit includes a main transformer for connection with an AC supply, an interstage transformer in each half circuit operative for controlling said first triacs, and second triacs for energizing the second transformers at the end of movement of the movable member in corresponding directions.

* * * * *